US012717535B2

(12) United States Patent
Du et al.

(10) Patent No.: US 12,717,535 B2
(45) Date of Patent: Aug. 25, 2026

(54) MULTI-DISPLAY INTERFACE ACTIVATION BASED UPON MOVEMENT

(71) Applicant: Lenovo (United States) Inc., Morrisville, NC (US)

(72) Inventors: Wenyu Du, Beijing (CN); Jung Hwan Hong, Cary, NC (US); Rod D. Waltermann, Rougemont, NC (US); Christopher Smith, Franklinton, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/902,714

(22) Filed: Sep. 30, 2024

(65) Prior Publication Data

US 2026/0093429 A1 Apr. 2, 2026

(51) Int. Cl.
*G06F 3/14* (2006.01)
*G06F 3/01* (2006.01)
*G06F 3/03* (2006.01)

(52) U.S. Cl.
CPC ............ *G06F 3/1423* (2013.01); *G06F 3/017* (2013.01); *G06F 3/03* (2013.01)

(58) Field of Classification Search
CPC ........... G06F 3/1423; G06F 3/017; G06F 3/03
See application file for complete search history.

(56) References Cited

U.S. PATENT DOCUMENTS 9,438,543 B2 * 9/2016 Goncalves ............ H04L 51/046
9,990,129 B2 * 6/2018 Yang ................... G06F 3/04883
10,013,228 B2 * 7/2018 Aurongzeb ............. G06F 3/013
10,048,767 B2 * 8/2018 Yoo ....................... G06F 3/0482
10,069,882 B2 * 9/2018 Karacas ................ G06F 3/1446
10,387,096 B2 * 8/2019 Kim ...................... G06F 3/1423
10,592,194 B2 * 3/2020 Rakshit .................. G09G 5/391
10,708,371 B2 * 7/2020 Linn ..................... H04L 67/535
10,845,980 B2 * 11/2020 Derks ................... G06F 3/1423
10,970,026 B2 * 4/2021 Klein .................... G06F 3/0487
10,996,913 B2 * 5/2021 Ku ........................ G06F 1/1681
11,262,885 B1 * 3/2022 Burckel .................. G06F 3/011
11,372,612 B2 * 6/2022 Kim ...................... G06F 3/1423
11,483,673 B2 * 10/2022 Lee ....................... H04W 4/026
11,550,461 B2 * 1/2023 Zhu ....................... G06F 3/1415
11,599,265 B1 * 3/2023 Peled .................... G06F 3/0488
11,714,544 B2 * 8/2023 Datwani ............. G06F 3/04883 345/173
12,045,532 B1 * 7/2024 Gupta ................... G06F 3/1446
12,067,227 B2 * 8/2024 Wang ...................... H04L 67/55
2008/0174547 A1 * 7/2008 Kanevsky .............. G06F 3/017 345/156
2015/0373065 A1 * 12/2015 Holmquist .......... H04L 65/1069 715/753
2018/0074594 A1 * 3/2018 Herz ................. H04N 21/4622
(Continued)

*Primary Examiner* — Grant Sitta
(74) *Attorney, Agent, or Firm* — FERENCE & ASSOCIATES LLC

(57) ABSTRACT

One embodiment provides a method, the method including: identifying, using a multi-display activation detection system, a first display and at least a second display are in operative communication with each other; detecting, at an input device, a movement having a predetermined shape; and activating, upon detection of the movement, a multi-display graphical user interface. Other aspects are claimed and described.

20 Claims, 4 Drawing Sheets

(56) References Cited

U.S. PATENT DOCUMENTS

| | | | | |
|---|---|---|---|---|
| 2018/0253224 | A1* | 9/2018 | Fransen | G06V 40/28 |
| 2019/0057671 | A1* | 2/2019 | Baer | G09G 5/373 |
| 2019/0212877 | A1* | 7/2019 | Sipko | G06F 3/1446 |
| 2020/0393909 | A1* | 12/2020 | Parland | G06V 40/20 |
| 2021/0096730 | A1* | 4/2021 | Greenebaum | G06F 3/04842 |
| 2021/0181853 | A1* | 6/2021 | Hassan | G06F 3/017 |
| 2021/0184853 | A1* | 6/2021 | Crowson | H04L 67/306 |
| 2021/0325970 | A1* | 10/2021 | Cheng | G06F 3/04842 |
| 2022/0179552 | A1* | 6/2022 | Burckel | G06F 3/04883 |
| 2023/0410379 | A1* | 12/2023 | Johnston | H04N 7/15 |

* cited by examiner

MULTI-DISPLAY INTERFACE ACTIVATION BASED UPON MOVEMENT

BACKGROUND

Many users utilize multiple displays when utilizing devices. For example, users may utilize a single device with multiple displays, multiples devices each having a dedicated display, a combination thereof, and/or the like. The use of multiple displays allows a user to view more information at a single time instead of having to reduce windows, open other windows, and/or the like. The ability to view more information at a single time is particularly useful when a user is working on a task or project that includes information in multiple instances of a single application, information in multiple applications, and/or the like. With the multi-display setup, the user can have more of the information visible at a single time than with traditional single display systems. Additionally, technology allows the user to set the multiple displays so that they will communicate with each other so that information can be shared across the displays, information can span across the displays, and/or the like.

BRIEF SUMMARY

In summary, one aspect provides a method, the method including: identifying, using a multi-display activation detection system, a first display and at least a second display are in operative communication with each other; detecting, at an input device, a movement having a predetermined shape; and activating, upon detection of the movement, a multi-display graphical user interface.

Another aspect provides a system, the system including: a first display; at least a second display; a processor; a memory device that stores instructions that, when executed by the processor, causes the system to: identify, using a multi-display activation detection system, the first display and the at least a second display are in operative communication with each other; detect, at an input device, a movement having a predetermined shape; and activate, upon detection of the movement, a multi-display graphical user interface.

A further aspect provides a product, the product including: a computer-readable storage device that stores executable code that, when executed by a processor, causes the product to: identify, using a multi-display activation detection system, a first display and at least a second display are in operative communication with each other; detect, at an input device, a movement having a predetermined shape; and activate, upon detection of the movement, a multi-display graphical user interface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
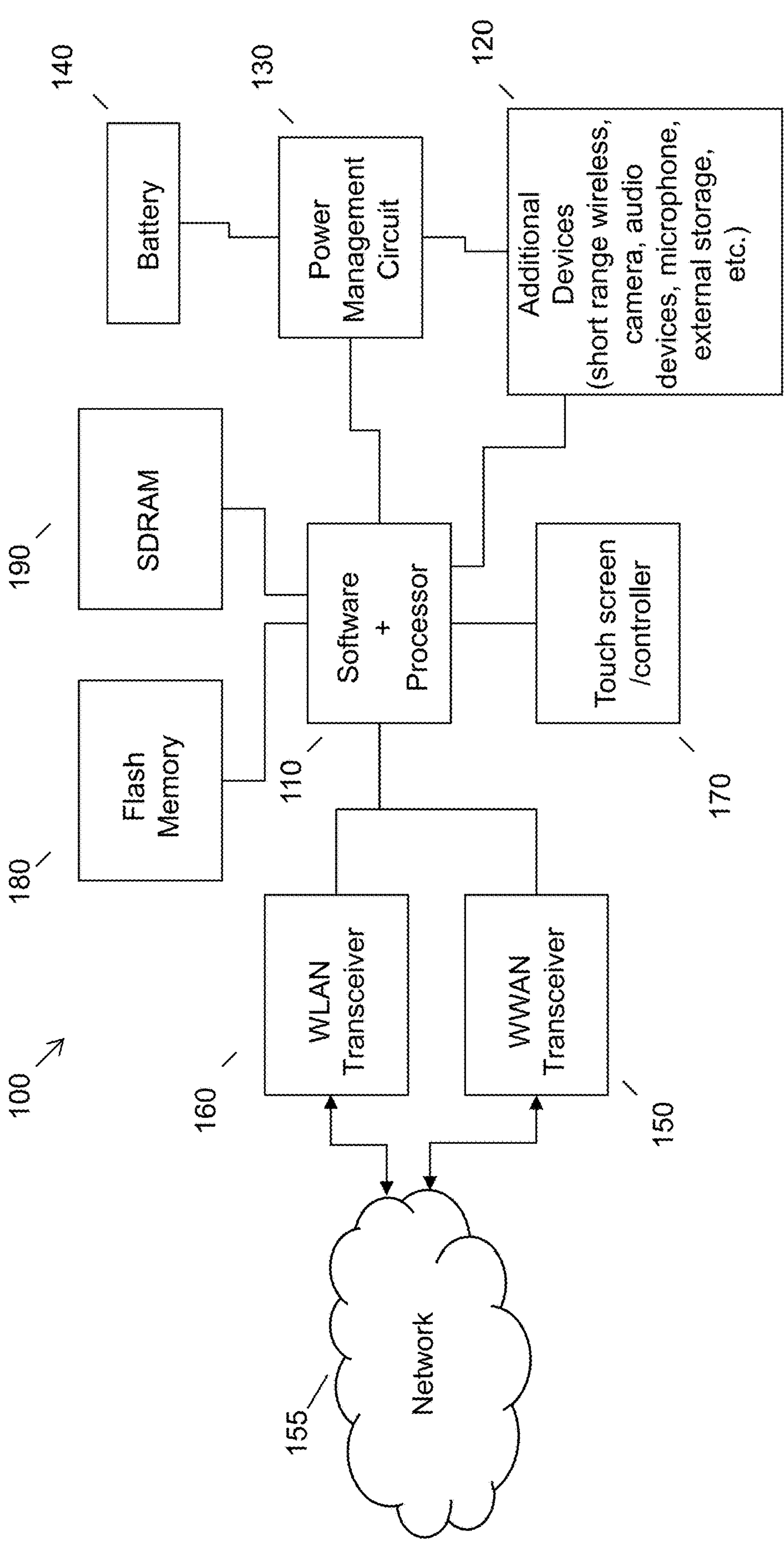
FIG. 1 illustrates an example of information handling device circuitry.

While conventional systems allow a user to set the displays in a multiple display setup to act a certain way with respect to each other, the steps required for doing so are cumbersome. For example, if the user wants the screen from one display to extend across to the screen of another display, the user has to perform the steps for this function. As another example, if the user wants the screen from one display to mirror the screen of another display, the user has to perform the steps for this function. As another example, if the user no longer wants the displays to act as previously set, the user has to perform additional steps to change the configuration of the multiple displays.

Additionally, in order to even provide instructions on how the displays are to act with respect to each other, the user has to access a display settings menu, which is frequently included in another settings menu. Thus, the user has to access the settings menu, select the displays settings menu, identify the appropriate settings, and provide the desired input for getting the monitors to act correctly. Additionally, since these steps may not be performed all the time, a user may forget where the correct settings menu is located. Thus, the user spends time trying to locate the correct menu to set the multiple displays. Additionally, the user may end up having to provide input to a search feature in order to find the correct menu, which is even more input and time required by the user to set up the displays as the user wants.

Accordingly, the described system and method provides for activating a multi-display graphical user interface for paired displays upon detection of a movement having a predetermined shape at an input device. The multi-display activation detection system identifies that a first display and at least a second display are in operative communication with each other. In other words, the system identifies that at least two displays can communicate with each other or that they are paired. The system then detects a movement having a predetermined shape. This movement can be received at an input device, for example, a mouse, a trackpad, on a touch screen, using a pointing stick, via a stylus, at an image capture device, and/or the like. The predetermined shape may have any shape, but it can be determined that the movement was an intentional movement to activate the graphical user interface because the movement matches a previously designated shape. Upon detecting the movement, the system activates a multi-display graphical user interface that allows the user to provides inputs related to the use of multiple displays.

Therefore, a system provides a technical improvement over traditional methods for activating an application. Instead of requiring the user to perform multiple steps to access a particular application, the described system and method provides a unique technique for accessing a multi-display graphical user interface which allows the user to perform multiple functions in relation to multiple displays. Thus, the described system and method provides a technique that allows for a more user intuitive method than traditional methods. Additionally, the simple movement required by the described system and method is simple and not as cumbersome as requiring the user to perform multiple steps to access the user interface. Accordingly, the described system and method is more user friendly, more efficient, and is unique as compared to traditional techniques for accessing a display settings menu.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks 155 (e.g., telecommunications networks, wireless Internet devices (e.g., access points), cloud networks, remote networks, local networks, etc.). Additionally, devices 120 are commonly included, e.g., a wireless communication device, external storage, camera, microphone, external storage, etc. System 100 often includes a touch screen 170 for data input and display/rendering. System 100 also typically includes various memory devices, for example flash memory 180 and synchronous dynamic random-access memory (SDRAM) 190.

Figure 2:
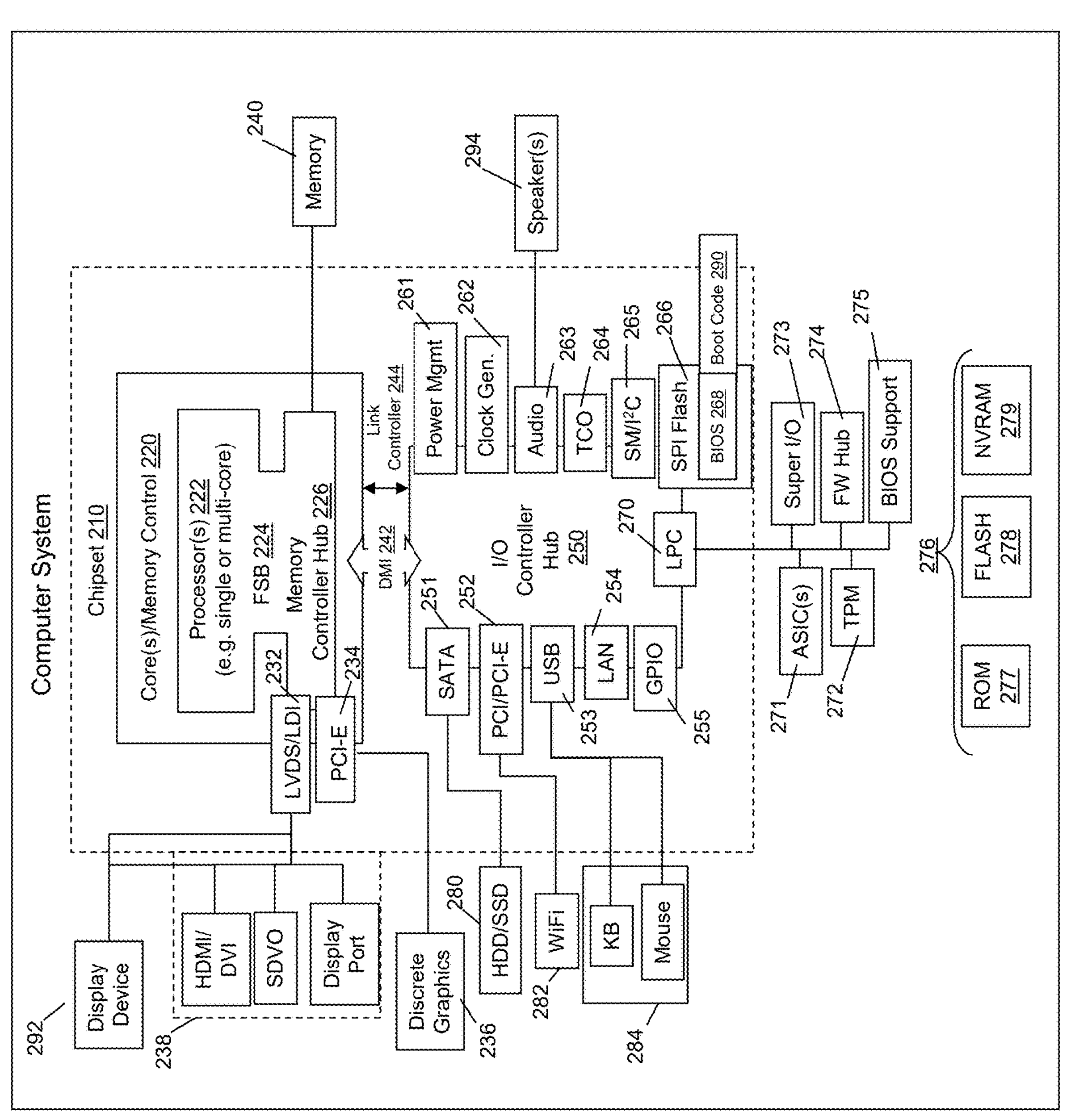
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be devices including displays that can be utilized with the described system. For example, the circuitry outlined in FIG. 1 may be implemented in a tablet or smart phone embodiment, whereas the circuitry outlined in FIG. 2 may be implemented in a personal computer embodiment.

Figure 3:
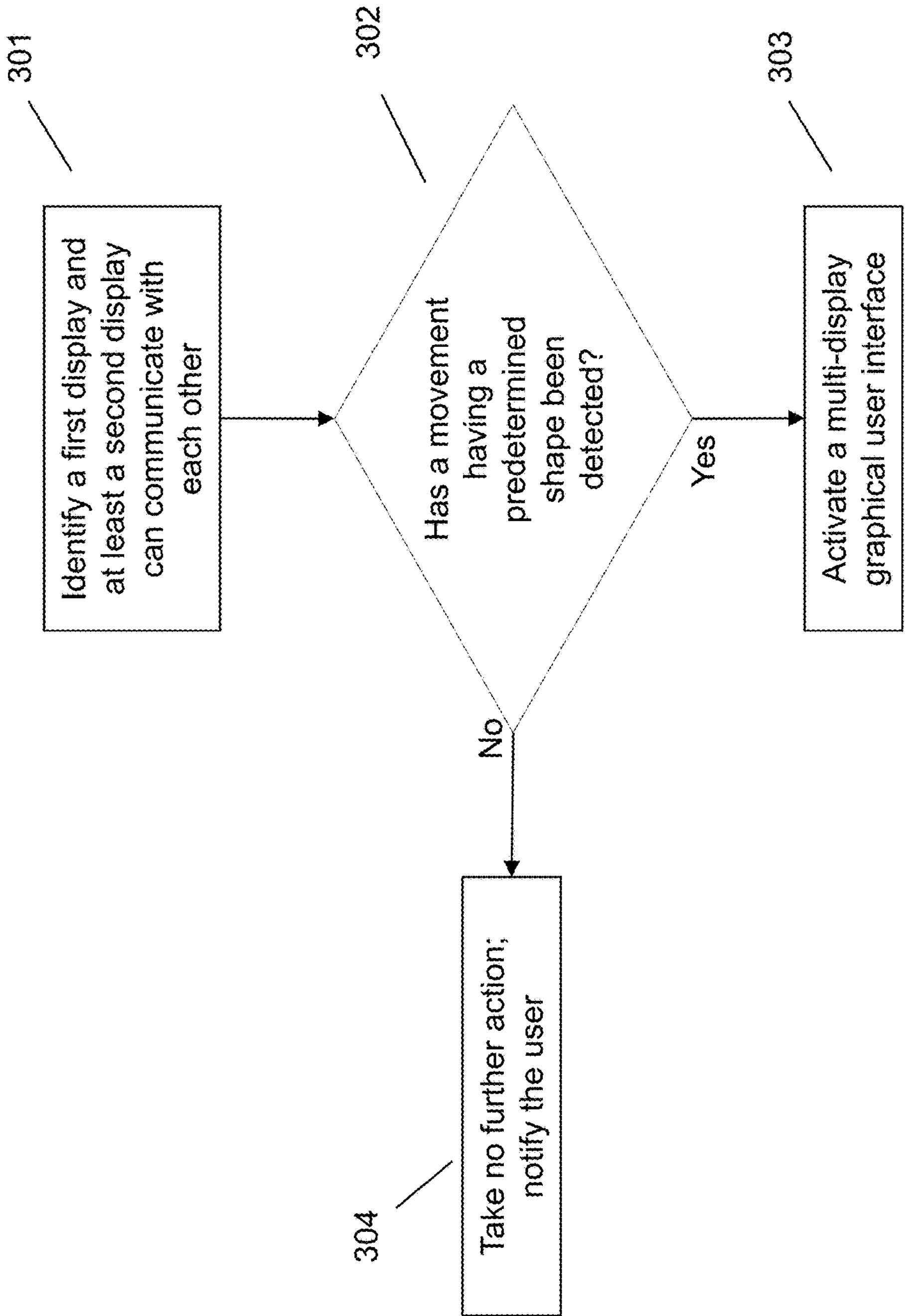
FIG. 3 illustrates an example method for activating a multi-display graphical user interface for paired displays upon detection of a movement having a predetermined shape at an input device.

FIG. 3 illustrates an example method for activating a multi-display graphical user interface for paired displays upon detection of a movement having a predetermined shape at an input device. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to activate a multi-display graphical user interface. Additionally, the multi-display activation detection system includes modules and features that are unique to the described system.

Activation of the multi-display activation detection system may be a manual activation of the multi-display activation detection system and/or an automatic activation of the multi-display activation detection system. The automatic activation of the multi-display activation detection system may be based upon the detection of a trigger event indicating that the system should be activated.

The multi-display activation detection system may be made of multiple systems or modules that communicate together to make up the multi-display activation detection system or may be a single system. The multi-display activation detection system may be a standalone system, may be accessible through other computing devices, and/or a combination thereof. For example, the multi-display activation detection system may be a standalone system that can be accessed by a user and/or may be or provide an application that is accessible by a user on another computing device. The multi-display activation detection system may be accessible using any type of computing device, for example, personal computer, laptop computer, smartphone, tablet, smartwatch, head-mounted display, smart television or other smart appliance, augmented reality device, virtual reality device, and/or the like.

Thus, the multi-display activation detection system may be accessible locally using a computing device where the multi-display activation detection system is installed and/or may be accessible remotely through another computing device. For example, the multi-display activation detection system may be accessed by a user using a device that communicates with the multi-display activation detection system. However, the multi-display activation detection system may be located and operate on a different information handling device as compared to the device being utilized by the user to perform the described steps.

The multi-display activation detection system may include different components for carrying out different functions of the system, including different steps to be performed. These components may be hardware components or software components. Some hardware devices or components that may be utilized by the multi-display activation detection system include input devices that may be utilized to receive input from the user, for example, mechanical input modalities (e.g., keyboard, mouse, trackpad, pointing stick, stylus, etc.), touch input devices, gesture input devices, electromyography input devices, audio input devices, image capture devices, and/or the like. Other hardware components may be utilized to provide output from the multi-display activation detection system. For example, the multi-display activation detection system may include speakers, displays or monitors, haptic output devices, audio output devices, and/or the like. Other hardware components may be included.

One software component includes the user profile that stores information related to the user and user preferences. The user profile may be unique to a user and may assist in detecting that the movement has a predetermined shape. For example, the user profile may identify the predetermined shape that the user wants to utilize for the movement. As another example, the user profile may identify what characteristics of the movement have to be detected before it is identified as the predetermined movement. The characteristics may include a length of time the movement has to be detected for, a number of iterations of the predetermined shapes that have to be detected for, a direction of the movement, a size of the predetermined shape that has to be detected, and/or the like. The user profile may also include other information about the user. The user may manually input data into the profile or the information within the profile may be populated by the system as the system learns about the user over time. This information can be populated within the user profile for use by the system during subsequent sessions.

At 301, the multi-display activation detection system may identify that a first display and at least a second display are in operative communication with each other. In other words, the system may identify that the displays, or corresponding devices, can communicate with each other. The example of a first display and a second display will be used here throughout. However, this is a non-limiting example, as any number of displays can be connected together so that they can communicate with each other. Additionally, while displays will be discussed here throughout, it should be noted that the displays may be connected to other information handling devices and it may be those devices that are in communication with each other instead of the displays directly with each other. Thus, while the term "displays" may be utilized, it may be the devices of the displays that allow the displays to "communicate" with each other. In other words, it may be the devices that communicate which then allow the displays to interact with each other. Thus, the term "display" is not intended to limit the description to only displays which would require that the displays directly communicate with each other.

The displays being in communication with each other may mean that the displays, or corresponding devices, are paired together so that they can communicate with each other, either directly or indirectly through corresponding devices, through short-range communication, near field communication, and/or the like. The displays could also be connected together using a wired connection. The displays may also be connected to the same network, which allows the displays to communicate with each other. Other techniques for allowing the displays to communicate with each other are contemplated and possible. Regardless of how the displays are in operative communication with each other, the multi-display activation detection system identifies that the displays are able to communicate with each other, either directly or indirectly through corresponding devices and are, therefore, able to be used in a multi-display configuration and set up.

The ability to communicate with each other allows the displays to be used in conjunction with each other, for example, with one display as an extension of the other display, with the displays operating as independent displays but allowing the user to provide input to either device using a single set of input devices, with the displays as mirrors of each other, and/or the like, or a combination thereof. However, setting up how the displays are used in conjunction with each other and performing other functions that are possible in a multi-display configuration, the user may need to access an application or settings menu, which can be activated using a movement having a predetermined shape.

Accordingly, at 302, the multi-display activation detection system determines whether a movement having a predetermined shape has been detected. The predetermined shape may be different or configured by the user, for example, in the user profile. However, the predetermined shape that will be discussed is a circular shape. This is not intended to be a limiting example, as any number of predetermined shapes can be utilized, for example, squares, ovals, X shapes, irregular shapes, cross-hatching, and/or the like. By requiring the movement to have a predetermined shape, the system can determine that the movement was intentionally provided to activate the multi-display graphical user interface. In other words, while the particular shape that is utilized is not important, the fact that the movement matches the shape that has been selected to activate the multi-display graphical user interface is important. Thus, the use of a shape that has been selected and stored will ensure that the system has something to compare the movement with, thereby allowing the system to determine if the user intended to activate the user interface.

In determining whether the movement has a predetermined shape, the movement may have to have particular characteristics. The characteristics that are required may be configurable by the user. However, possible characteristics may include a predetermined number of iterations of the predetermined shape, a predetermined length of time that the predetermined shape has to be provided, the predetermined shape may have to be provided as a continuous movement, a predetermined size of the predetermined shape, a predetermined direction of movement of the predetermined shape, the predetermined shape being provided in a particular location with an input device, and/or the like, or a combination thereof. For example, the movement may have to be a circular shape that the user provides for two seconds to activate the graphical user interface. As another example, the movement may have to be a circular shape that is provided three times, meaning the user makes a circular shape three times, to activate the graphical user interface. As a final, non-limiting example, the movement may have to be circular shape that is provided in a clockwise direction, as a continuous movement, in the center of a display screen, for at least five seconds to activate the graphical user interface.

As can be readily understood, any combination of characteristics can be utilized to determine if the movement matches the predetermined shape. Additionally, the characteristics do not have to include all of the example characteristics or could include different characteristics not listed. For example, the system may allow the shape to be provided in either a clockwise or counterclockwise direction, instead of having a required direction. As another example, the predetermined shape could be provided as having any size. As another example, the system may not have any characteristic requirements and may instead only require that the predetermined shape be provided. These are non-limiting examples.

It should also be noted that some characteristics may vary based upon the input device that is being utilized. For example, a predetermined shape provided on a touch screen may not be able to be as big as a predetermined shape provided using a mechanical mouse. Thus, the system may associate each of the characteristics with the input device that is being utilized to provide the movement. Then when a particular input device is being used to provide the movement, the system may compare the movement to the predetermined shape and characteristics, if any, for that input device instead of requiring the exact same predetermined shape and characteristics across all input devices.

The predetermined shape may be detected at an input device. For example, the user could provide the predetermined shape using a mouse, trackpad, pointing stick, touch screen, stylus, an image capture device, and/or the like. In the example of an image capture device, the user could provide a gesture having the predetermined shape that is captured by the image capture device. In the example of a stylus, the input could be provided using a stylus on another input device (e.g., touch screen, track pad, etc.), or the stylus could have functionality that allows the stylus to detect motion. The motion from the stylus could be utilized to determine if the stylus was moved in the predetermined shape, even if the stylus is not being used to provide input to another input device. In the example of the touch screen or track pad, the user could provide input of the predetermined shape on the touch screen using their finger, stylus, or other input method. This input can then be used to detect that the predetermined shape has been provided. In the examples of the mechanical input devices (e.g., mouse, pointing stick, etc.), the input device could detect the motion and determine if a predetermined shape has been provided.

Alternatively, or additionally, instead of the movement of the devices being detected, the system may monitor a display object that corresponds to input devices. For example, some or all of the input devices may control a cursor or other display object on the screen of display. Thus, instead of monitoring the device, the system could monitor the display object to determine if the display object is being moved to match the predetermined shape. If the display object is being moved to match the predetermined shape, the system may determine that the predetermined shape has been detected. Such a technique can be used for mechanical input devices (e.g., mouse, pointing stick, etc.) and for other of the input devices. In other words, such a technique is not only limited to the mechanical input devices.

If a movement having the predetermined shape has not been detected at 302, the system may take no further action and/or notify the user at 304. In other words, the multi-display activation detection system may not activate the multi-display graphical user interface. The system may notify the user that the movement was not sufficient to activate the user interface if the system detects a movement that appears to be the user attempting to activate the user interface. For example, if the movement did not reach the predetermined number of iterations, did not reach the predetermined length of time, was a movement in the wrong direction, was not of a sufficient size, and/or the like, compared to the predetermined shape, the system may determine that the user may have been attempting to activate the user interface. Thus, the system may notify the user of the insufficiency so that the user could attempt the movement again. Alternatively, or additionally, the system could provide a pop-up window or other notification asking the user if they were attempting to activate the user interface. The user could then provide input to the notification and, in the affirmative, the system could activate the user interface based upon this input.

Figure 4:
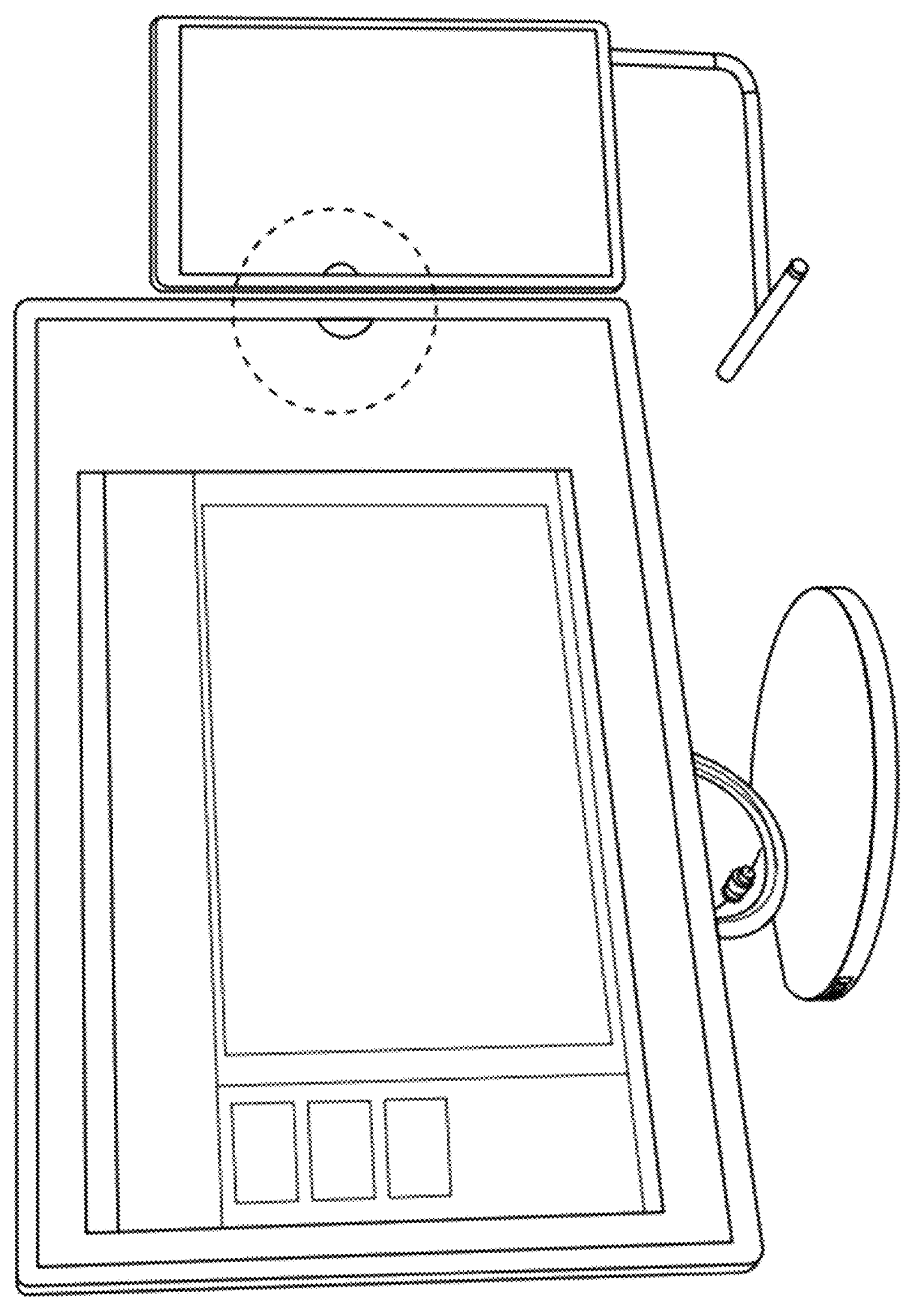
FIG. 4 illustrates an example graphical user interface that may be activated upon detection of a movement having a predetermined shape.

If, on the other hand, the movement having the predetermined shape was detected at 302, the system may activate the multi-display graphical user interface at 303. Activating the multi-display graphical user interface may also include presenting a visual indicator associated with the user interface on at least one of the first display and the second display. It should be noted, that activation of the graphical user interface may simply include triggering display of an icon that can be selected to open the user interface. In other words, an entire user interface may not be displayed, but instead the system may display the icon needed to access the user interface. An example of a multi-display graphical user interface is illustrated in FIG. 4, with the visual indicator of the multi-display graphical user interface contained within the dashed circle. The multi-display graphical user interface will then allow the user to perform functions associated with multi-display configurations.

It will be readily understood that the components of the embodiments, as generally described and illustrated in the figures herein, may be arranged and designed in a wide variety of different configurations in addition to the described example embodiments. Thus, the more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

identifying, using a multi-display activation detection system, that a first display and at least a second display are in operative communication with each other;

detecting, at an input device, a movement having a predetermined shape; and activating, upon detection of the movement, a multi-display graphical user interface that allows a user to provide inputs related to the use of the first display and the at least a second display in a multi-display configuration, wherein the multi-display graphical user interface is displayed across the first display and the at least a second display, wherein a first portion of the multi-display graphical user interface is displayed on the first display and wherein second corresponding portion of the multi-display graphical user interface is displayed on the at least a second display.

2. The method of claim 1, wherein the predetermined shape comprises a circular shape.

3. The method of claim 1, wherein the detecting comprises detecting a predetermined number of iterations of the predetermined shape.

4. The method of claim 1, wherein the detecting comprises detecting the movement for a predetermined length of time.

5. The method of claim 1, wherein the detecting comprises detecting the predetermined shape as a continuous movement.

6. The method of claim 1, wherein the detecting comprises detecting the predetermined shape as being of a predetermined size.

7. The method of claim 1, wherein the detecting comprises detecting the predetermined shape as having a predetermined direction of movement.

8. The method of claim 1, wherein the predetermined shape is configurable by a user.

9. The method of claim 1, wherein the activating comprises presenting a visual indicator associated with the multi-display graphical user interface on at least one of the first display and the at least a second display.

10. The method of claim 1, wherein the detecting comprises detecting the movement at an input device selected from the group consisting of: a mouse, a trackpad, a touch screen, an image capture device, and a stylus.

11. A system, the system comprising:

a first display;

at least a second display;

a processor;

a memory device that stores instructions that, when executed by the processor, causes the system to:

identify, using a multi-display activation detection system, that the first display and the at least a second display are in operative communication with each other;

detect, at an input device, a movement having a predetermined shape; and activate, upon detection of the movement, a multi-display graphical user interface that allows a user to provide inputs related to the use of the first display and the at least a second display in a multi-display configuration, wherein the multi-display graphical user interface is displayed across the first display and the at least a second display, wherein a first portion of the multi-display graphical user interface is displayed on the first display and wherein second corresponding portion of the multi-display graphical user interface is displayed on the at least a second display.

12. The system of claim 11, wherein the predetermined shape comprises a circular shape.

13. The system of claim 11, wherein the detecting comprises detecting a predetermined number of iterations of the predetermined shape.

14. The system of claim 11, wherein the detecting comprises detecting the movement for a predetermined length of time.

15. The system of claim 11, wherein the detecting comprises detecting the predetermined shape as a continuous movement.

16. The system of claim 11, wherein the detecting comprises detecting the predetermined shape as being of a predetermined size.

17. The system of claim 11, wherein the detecting comprises detecting the predetermined shape as having a predetermined direction of movement.

18. The system of claim 11, wherein the predetermined shape is configurable by a user.

19. The system of claim 11, wherein the detecting comprises detecting the movement at an input device selected from the group consisting of: a mouse, a trackpad, a touch screen, an image capture device, and a stylus.

20. A product, the product comprising:

a computer-readable storage device that stores executable code that, when executed by a processor, causes the product to:

identify, using a multi-display activation detection system, that a first display and at least a second display are in operative communication with each other;

detect, at an input device, a movement having a predetermined shape; and activate, upon detection of the movement, a multi-display graphical user interface that allows a user to provide inputs related to the use of the first display and the at least a second display in a multi-display configuration, wherein the multi-display graphical user interface is displayed across the first display and the at least a second display, wherein a first portion of the multi-display graphical user interface is displayed on the first display and wherein second corresponding portion of the multi-display graphical user interface is displayed on the at least a second display.

* * * * *